United States Patent [19]

Strange et al.

[11] Patent Number: 5,018,113

[45] Date of Patent: May 21, 1991

[54] DAMAGE LOCATION SYSTEM FOR A TANKER SHIP

[76] Inventors: Booth B. Strange, 11106 Wickway, Houston, Tex. 77042; Ben B. Thigpen, 13914 Kimberly, Houston, Tex. 77079

[21] Appl. No.: 545,571

[22] Filed: Jun. 29, 1990

[51] Int. Cl.$^5$ .............................................. G01S 3/808
[52] U.S. Cl. ..................... 367/127; 367/191; 367/129; 73/786
[58] Field of Search ................. 73/786; 367/13, 127, 367/129, 191

[56] References Cited

U.S. PATENT DOCUMENTS

| | | | |
|---|---|---|---|
| 4,241,683 | 12/1980 | Conway | 114/74 R |
| 4,249,834 | 2/1981 | Bouvier | 405/70 |
| 4,285,241 | 8/1981 | Smith et al. | 73/572 |
| 4,301,006 | 11/1981 | Davis | 210/96.1 |
| 4,317,186 | 2/1982 | Nishi et al. | 367/127 |
| 4,412,501 | 11/1983 | Davis | 114/270 |
| 4,480,480 | 11/1984 | Scott et al. | 73/786 |
| 4,586,378 | 5/1986 | Izumi et al. | 367/129 |
| 4,897,823 | 1/1990 | Krien | 367/127 |

Primary Examiner—Ian J. Lobo
Attorney, Agent, or Firm—William A. Knox

[57] ABSTRACT

Hydrophones are installed in each tank of a liquid cargo tanker ship. In the unfortunate event that the tanker collides with an obstacle in the water, the hydrophones detect the shock wave due to the collision. The relative first arrival times of the shock wave at the respective hydrophones are measured and the arrival-time differences between two hydrophones of any two different selected pairs of hydrophones is calculated. Hyperbolic lines of constant time difference are projected on a map of the locations of the hydrophones on the ship. The intersection of the lines of position representing the calculated first arrival time differences marks the location of the impact of the ship with the obstacle.

11 Claims, 4 Drawing Sheets

DAMAGE LOCATION SYSTEM FOR A TANKER SHIP

BACKGROUND OF THE INVENTION

1. Field of the Invention

This invention is a sonic method and means for locating the damage to a liquid cargo tank in a tanker ship that occurred due to collision or impact with an obstruction in the water. This disclosure is related to U.S. patent application No. 07/479,259, filed 02/13/90, and now U.S. Pat. No. 4,960,347, for a Ship-borne Emergency Oil Containment System and Method.

2. Discussion of the Prior Art

In the above-cited disclosure, emphasis was placed upon containing the oil spilled from a damaged tanker ship at the source, namely at the ship itself, rather than letting the spillage spread around over the sea to befoul the environment. In that method, a ruptured cargo tank is emptied into a normally-empty emergency holding tank so that the oil will not get into the water in the first place. Additionally, the ship's crew deploy a ship-borne barrier curtain around the ship, or at least around the damaged tank, to prevent further dispersal of whatever oil that may have leaked out of the ship when the damage first occurred.

Large tankers, on the order of a quarter mile long, are fairly common. On a ship that large, there is a very real problem in timely identifying which one of the many tanks is affected by an impact with an underwater obstacle. Tankers typically have a draft of about 60 feet. By the time the oil plume from the stove-in tank bubbles to the surface much oil will have already escaped before remedial action can be taken. Further, in the presence of a modest ocean current, the plume is carried downstream so that a punctured cargo tank cannot be accurately spotted by simple visual inspection from the deck.

It would be useful to provide instrumental means within each tank of a tanker for positively identifying a damaged tank. Not only could such a means be used to identify a tank that has actually been cut open to the sea, it could also be used to identify a tank that has been merely bent out of shape and weakened by an impact so that the tank can be repaired at the next post-of-call.

U.S. Pat. Nos. 4,412,501 and 4,301,006, both entitled Ship-borne Oil Dispersant Procedure and Apparatus, and filed respectively 06/05/81 and 06/04/79 describe a method and means for dumping an oil dispersant into a ruptured cargo tank. The inventor teaches three means for damage detection: (1) An oil-level gauge for monitoring the oil level in a tank; (2) A pressure detector for detecting a drop in pressure in a tank; and (3) A wall deformation detector, composed of a network of tension wires lining the inside wall of a tank, that upon wall-rupture would send a signal to release the dispersant.

When a tank is ruptured, a good bit of oil is released but at the same time sea water necessarily invades the tank to replace the missing oil. See for example, U.S. Pat. No. 4,241,683 for a Liquid Cargo Tank Construction. An oil level gauge would not be very diagnostic if the oil is replaced by water so that the tank remains full of liquid despite the oil leakage. Similarly, for the pressure detector. The wall deformation detector, including its permanently-mounted network of tension wires, is rather complicated to install and could easily be damaged and rendered ineffective during routine maintenance and tank-cleaning operations. Of course, it would also be hazardous to workers if they needed to physically enter an oil tank to repair the tension wires.

U.S. Pat. No. 4,249,834, issued 02/10/81, discloses a ship having a plurality of relatively small cargo tanks. The concept is that if one of the tanks is slit open, not much oil will escape because the tank does not have a very large capacity. The patentee also teaches use of liquid-level gauges coupled to a display to show which tank is ruptured. Use of liquid-level gauges is ineffective for the reasons stated supra.

SUMMARY OF THE INVENTION

It is an object of this invention to provide a way to positively identify, by sonic means, a specific tank on a tanker ship that has been impacted by an obstacle in the water, regardless of whether the tank is actually ruptured or merely dented by the impact.

In accordance with an aspect of this invention, we install an acoustic sensor such as a hydrophone array in each of the liquid cargo tanks. The hydrophones are electrically coupled through a multiplexer to a gain ranging amplifier. The hydrophone output signals are preferably displayed on a multi-trace time scale recording of any desired type. Under normal conditions, the ambient noises of ship operation, as detected by the hydrophones, are suppressed or squelched so that the multi-trace recording is relatively quiet. If the ship hits an obstruction, the shock wave will produce a high amplitude signal that will break through the squelch. The relative time differences between the onset of the shock wave as seen at the respective hydrophones, measured from a time-scale recording, are used to pinpoint the tank affected.

In accordance with another aspect of this invention, signals from two-axis accelerometers measure the force and direction of the impact thereby to estimate the probability that catastrophic damage has occurred.

In accordance with another aspect of this invention, we provide a map, drawn to scale, of the locations of the hydrophones. We project on the map, a family of hyperbolae representing lines of constant time differences between hydrophone pairs. The foci of the projected hyperbolae are aligned over the map locations of any two hydrophones, positioned athwart-ship, from which an accurate shock-wave-signal time difference is available. The measured time difference is marked on the map as a line of position. Similarly, the shock-wave time difference for any other pair of hydrophones, preferably along the fore-and-aft axis, is plotted. The intersection of the two plotted lines of position is the damage location.

BRIEF DESCRIPTION OF THE DRAWINGS

These and other benefits of our invention will be more readily appreciated by reference to the accompanying detailed description and the drawings wherein.

DETAILED DESCRIPTION OF THE PREFERRED EMBODIMENT

Figure 1:
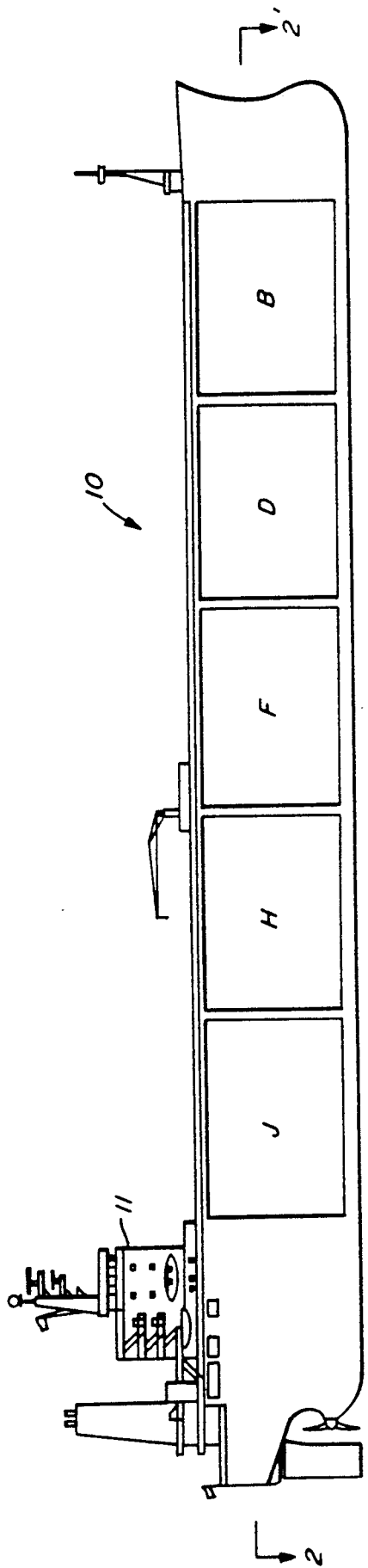
FIG. 1 is a side view of a tanker ship taken in partial cross-section.

FIG. 1 shows a tanker ship 10 in partial cross section, showing a typical disposition of liquid cargo tanks. Two-axis accelerometers X1 and X2 are shown located near the stern and the bow of the ship.

Figure 2:
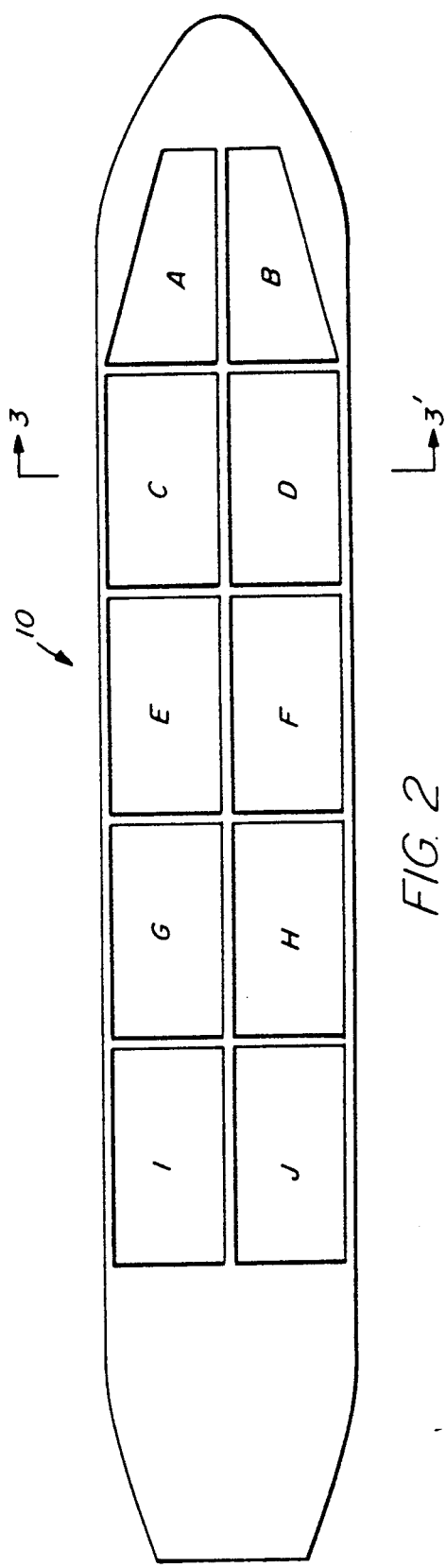
FIG. 2 is a plan view of the ship along section 2—2' of FIG. 1.

FIG. 2 is a plan view of ship 10 along section 2—2', showing tanks A, B, ..., J. Accelerometers X1 and X2 are preferably located along the center line of the ship as shown.

Figure 3:
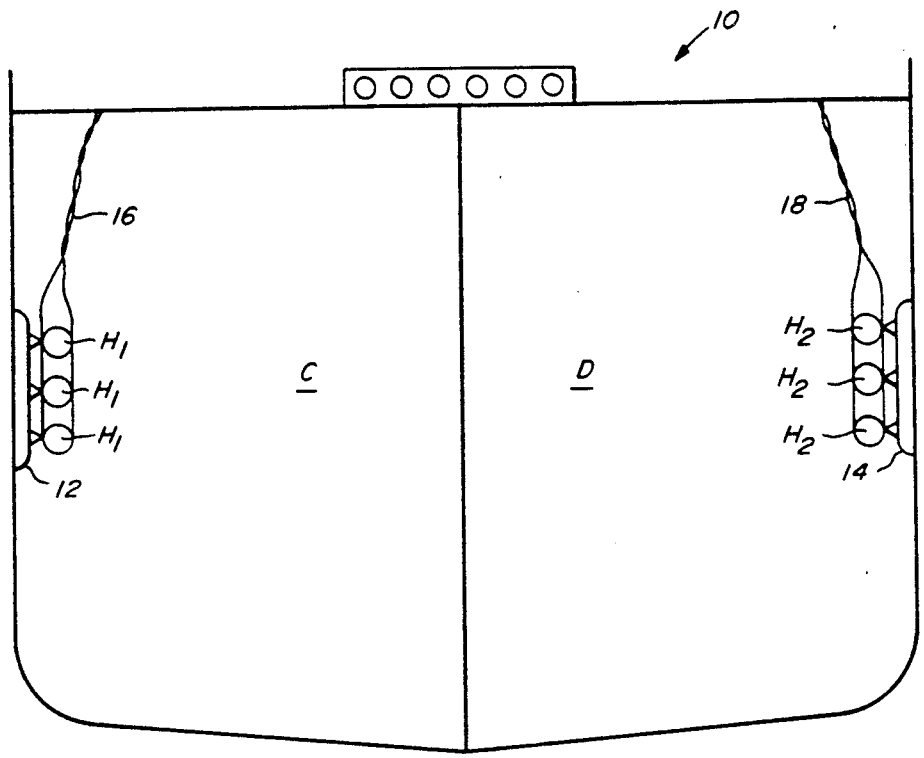
FIG. 3 is an athwart-ship cross section of a cargo tank showing the preferred locations for the hydrophones.

FIG. 3 is a cross section along line 3—3' showing tanks C and D. Passive acoustic sensors such as hydrophones H1 and H2 are mounted on suitable brackets 12 and 14, preferably above the bottom by about one third to one half the draft of the ship. By passive, we mean that no external power is needed by the hydrophones for their operation. At least one hydrophone may be installed, but for redundancy, an array of two or more hydrophones, coupled in parallel are preferred. The hydrophones are to be mounted as far apart as possible, both laterally and longitudinally with respect to the ship, to provide an adequate base line for time difference measurements. Alternatively, the hydrophones could be suspended from beneath the deck. Signal leads 16 and 18 conduct the hydrophone signals to instrumentation (not shown in FIG. 3) in the wheel house 11 of FIG. 1.

Figure 4:
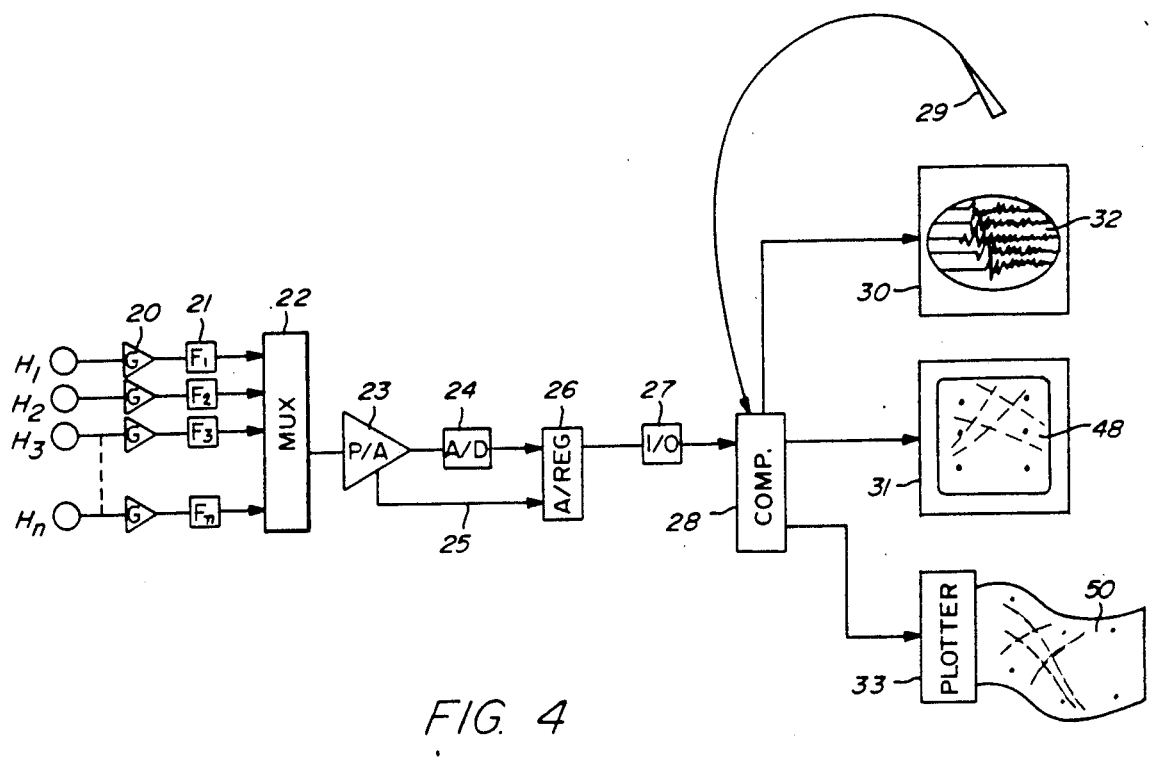
FIG. 4 is a schematic diagram of a recording system for the hydrophones.

FIG. 4 is a schematic diagram of circuitry 19 useful to implement our invention, which circuitry may be installed in wheelhouse 11 of FIG. 1. Signals from the hydrophones H1, H2, ..., Hn in the respective tanks are fed to fixed-gain preamplifiers, such as 20, of any well known type. The preamplifiers include an adjustable initial gain that is set to a gain level that will suppress or squelch the ambient background noises, associated with normal ship operation, that are detected by the hydrophones. The initial gain is set to inhibit recording of signals unless a transient signal exceeds the average signal level by some preselected value. The initial gain may be adjusted to accommodate varying conditions of weather and loading thereby to periodically re-establish the ambient noise signature as required. The initial gain is set such that a strong impulsive shock wave, 12 dB or more above the average background level, due to a collision will break through the squelch.

The signal output from the respective preamplifiers are delivered to low-pass filters such as 21 and thence to multiplexer 22. The output from multiplexer 22 is passed to a gain-ranging amplifier 23 of any desired type. The gain-conditioned analog signals from gain-ranging amplifier 23 are digitized by analog-to-digital (A/D) converter 24 and sent to an assembly register 26 where the data signals are formatted into digital data words. Gain information is transmitted from gain-ranging amplifier 23 to assembly register 26 over line 25 so that the true amplitude of the signals can be recovered. A sample rate clock (not shown) controls the sample rate of the data signals from the hydrophones.

An input/output (I/O) register conditions the digital data words from assembly register 26 for acceptance by a computer 28. Computer 28 stores a block of data gathered over some convenient time interval such as ten or fifteen minutes. At some desired sample rate such as one millisecond (ms) for example, a ten-minute data block from ten channels will occupy 6 megabytes (Mb) which can easily be stored on a 40 Mb hard disk. As new data arrive, old data are shifted out.

The stored data normally will be continuously displayed in real time on a multi-trace video monitor 30 as a function of time, each trace representing the signals heard by each of the hydrophone arrays. During normal operations, and dependent upon the setting of the initial gain control, the displayed traces 32 will be relatively quiet. In the event of a collision, the resulting shock wave will produce transient waveforms that will rise 24 to 48 dB or more above the average background level as seen on the monitor screen. The computer will be programmed such that a high-amplitude transient will trigger a normally-inactive graphic video display 31 or an optional graphic plotter 33 of any well known type. Either one of the devices 31 or 33 will display a map of the hydrophone locations with hyperbolic lines of position projected thereon showing the location of a damaged tank as will be described below. The graphic plotter 33 will provide hard copy for archival storage in preparation for the investigation that will undoubtedly ensue. Because the ship may bounce off and re-impact the same object more than once, the graphic display devices 31 and 33 would be kept running until things quiet down.

Figure 5:
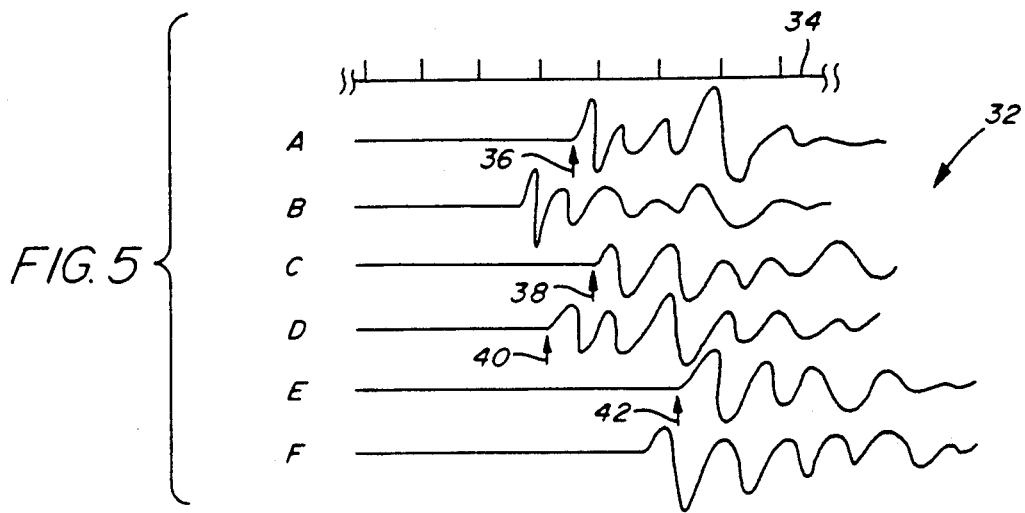
FIG. 5 is a time scale recording of the output signals of the hydrophones, after a collision, showing the travel-time differences between the sensors.

FIG. 5 shows in greater detail the format of the multi-trace display 32 that would be seen on real time monitor 30 immediately after a collision. Traces A through F are time scale recordings of the impulsive shock waves detected by the hydrophones or hydrophone arrays located in the corresponding cargo tanks. To the left, before the collision, the traces are quiet. The high-amplitude trace deflections indicate the instant at which each hydrophone heard the shock wave. A time scale 34 is superimposed over the traces so that time differences can by measured. The time differences may be measured by visual inspection or by means of a light pen 29 (FIG. 4) which transfers the time measurements directly to the computer for further processing. The time divisions are marked in arbitrary time units such as every 0.100 second, for example.

When a ship rams an object, high-amplitude low-frequency acoustic waves are generated that are detected by the hydrophones. The sound waves travel through liquid cargo at a velocity on the order of 4500 to 5000 feet per second (fps) depending upon the physical characteristics of the fluid cargo. The liquid-borne waves are low-frequency, on the order of a few hertz. For a ship that is a quarter of a mile long, assuming an impact at the bow, a hydrophone at the stern of the ship would detect a transient about 0.200 second later than would a bow-mounted hydrophone. The shock wave will also be transmitted through the steel hull of the ship at a much higher velocity than through the liquid but the initial transient through steel will be relatively weak because the relatively thin steel plating does not transmit much energy. The metal-borne signal will be of a much higher frequency than the liquid-borne transients. The higher-frequency transients will be attenuated by the low-pass filters 21 of FIG. 4. It is apparent therefore, that there will be a substantial measurable difference in the arrival times between the low-frequency slower-traveling transients as detected by the respective hydrophones.

When an obstacle is struck, the exact instant of impact will not be known unless a sensor happened to be installed at the precise impact point, if indeed, that instrument survived the crash. Hence, although we cannot measure the absolute arrival times of an impulsive shock wave at any given hydrophone, we can measure the relative arrival times and thus, the time differences between arrivals at different hydrophones. The position, on the ship, of an impact can be determined by analyzing the arrival-time differences of the shock waves.

Figure 6:
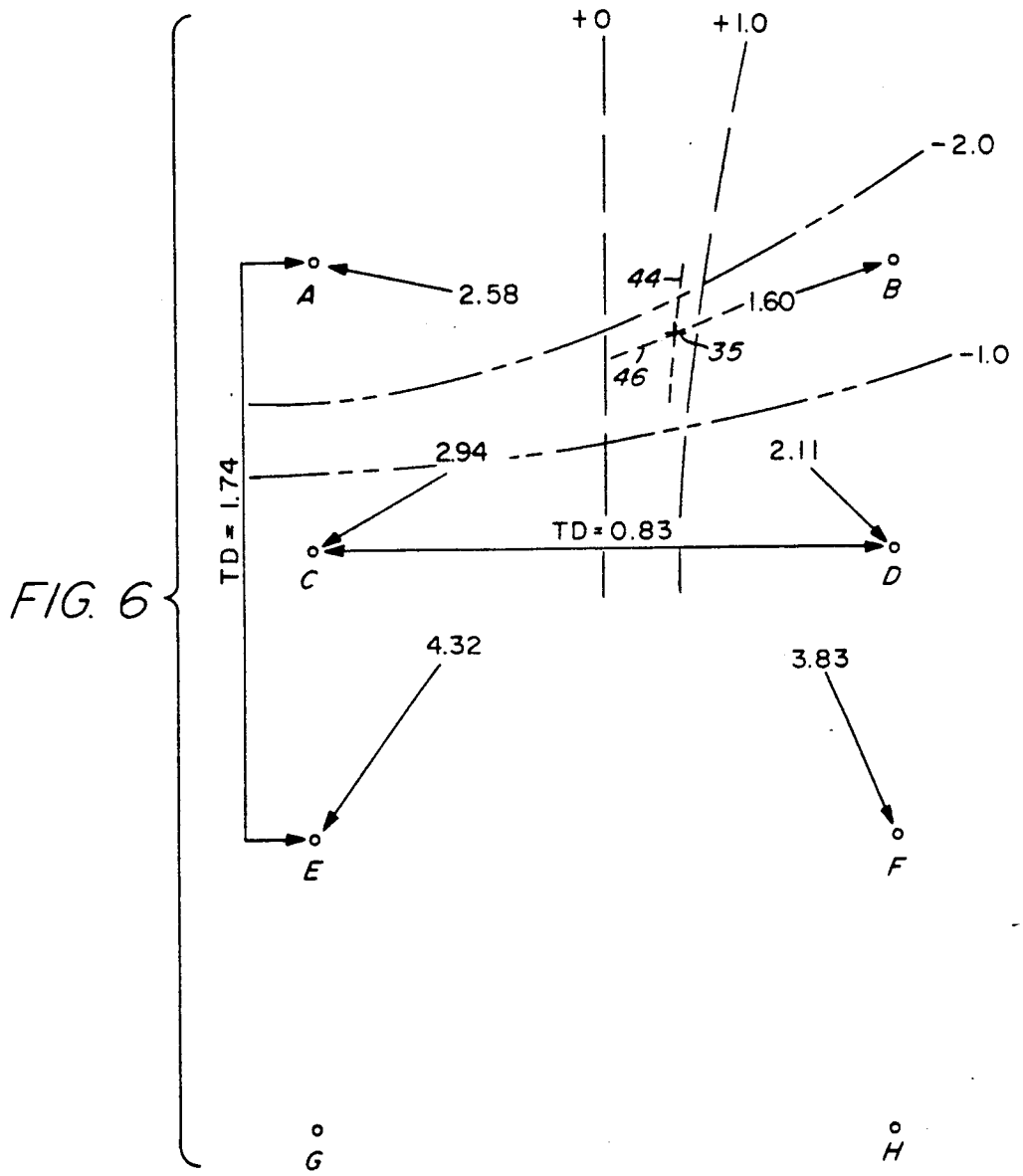
FIG. 6 is a map, drawn to scale, of the hydrophone locations showing theoretical travel times to each instrument as well as the travel-time differences that would be measured from the time scale recording of FIG. 5.

Refer now to FIGS. 5 and 6. FIG. 6 is a map, drawn to an arbitrary scale, of the hydrophone positions aboard a tanker. The open circles marked A through J represent hydrophones. Cross 35 represents the postulated location of a gash in tank B. The outlines of the tanks have not been shown to avoid complicating the drawing. For purposes of example, the annotated slanted arrows represent the absolute arrival times of a shock wave from point 35 to the respective sensors, which however, in real life, we could never know. Referring back to FIG. 5, there are shown positive-going trace deflections which indicate the relative first arrival instants of the shock waves at the different hydrophones. Thus arrow 36 is the time of arrival at hydrophone A; arrows 38, 40, 42 are corresponding first-arrival times to hydrophones C, D and E. The time difference (TD) between hydrophones C and D is 0.83 in arbitrary units; between A and E, TD=1.74. Knowing the time difference between any two hydrophone pairs athwart-ship (laterally separated) and between any two hydrophone pairs along the fore-and-aft axis (longitudinally separated), we can locate the exact point of impact by use of the overlay now to be described for FIG. 7.

Figure 7:
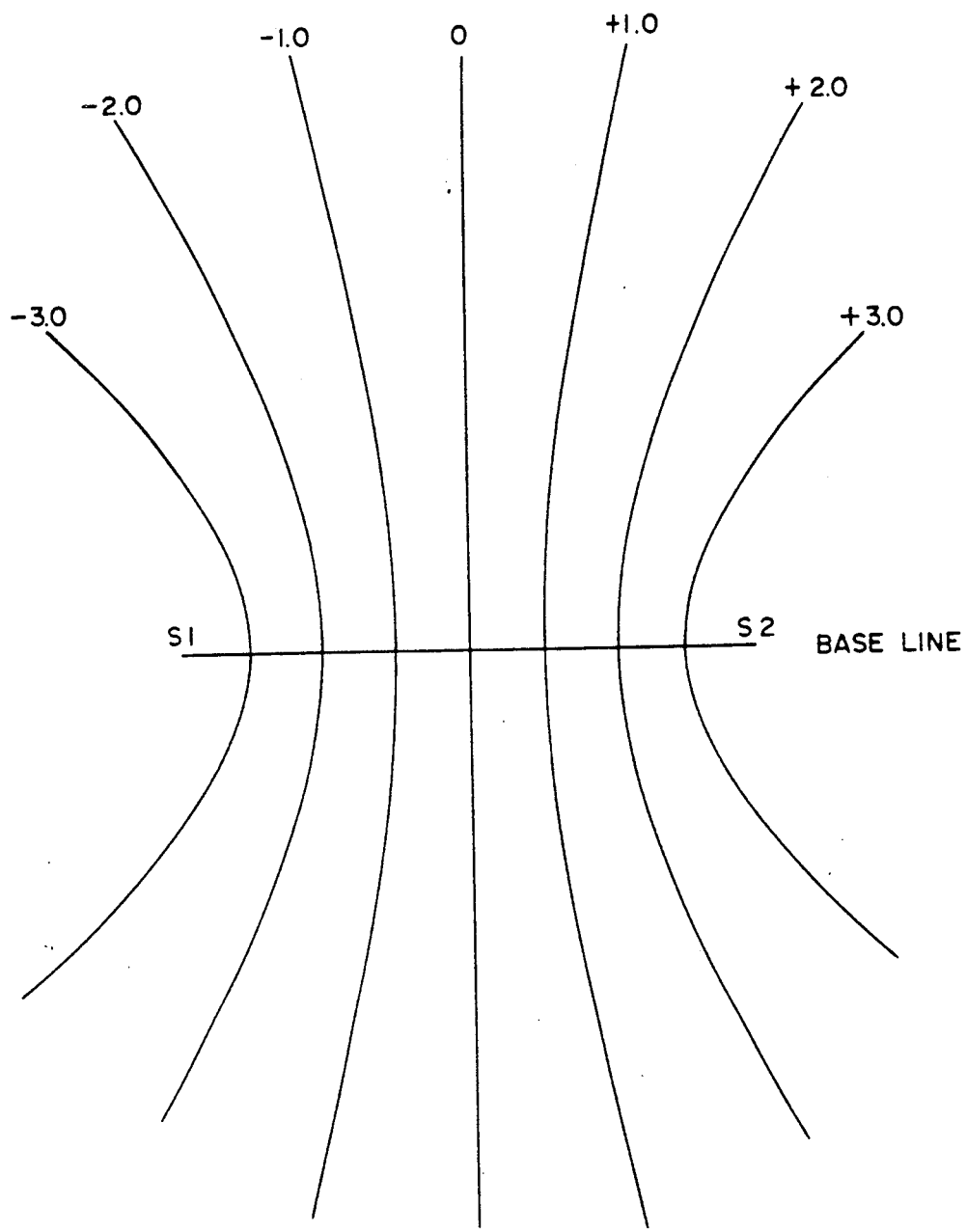
FIG. 7 is a family of hyperbolae representing lines of constant time difference.

FIG. 7 represents an overlay or projection, consisting of a family of hyperbolae representing lines of constant time difference in arbitrary units of length. The scale factor of the overlay of FIG. 7 is the same as the scale factor of FIG. 6. The hyperbolae are labeled as 0, 1, 2, 3 unit time-differences in both plus and minus directions. A base line is shown with points S1 and S2 marking the foci of the hyperbolae. The spacing between S1 and S2 is the same as the mapped separation of the two hydrophones of a pair. Having specified the foci, the hyperbolae are constructed in accordance with well-known geometric principles.

In operation, the family of hyperbolae is projected on the map and is positioned first with S1 and S2 projected over the mapped locations of any two laterally separated hydrophones such as the pair C and D. From FIG. 5, the time difference is measured as being +0.83 unit. A line of position 44 is drawn at 0.83 between hyperbolae 0 and +1.0. The overlay or projection is next rotated 90° with S1 and S2 superimposed over the mapped positions of pair A and E. A time difference of −1.74 units is found for traces A and E in FIG. 5. A line of position 46 at −1.74 units is drawn between hyperbolae −1.0 and −2.0. The intersection of the two lines of position is the location 35 of the impact. If the hydrophone under S1 of the projection exhibits the longer of the two arrival times on the time scale recording 32, the algebraic sign of the difference is positive; otherwise it is negative. If the longitudinal spacing of the hydrophones is not an integral multiple of the lateral spacing, two projections may be required but with differently-spaced foci. In this example, for convenience, we have chosen hydrophone pairs lying along lines that are orthogonal to each other. Of course, any pair of hydrophones for which a measurable time difference is available may be used provided the family of hyperbolae is suitably scaled.

It is contemplated that, when the ship is commissioned, a map of the hydrophone locations will be provided along with suitable pre-computed overlays. Those items will be readily available in the pilot house along with other ship's papers normally carried aboard a ship.

Although use of a physical map and overlay is convenient, it is preferred that the computer 28 of FIG. 4, be programmed to provide the map with the hyperbolic lines of position projected thereon as shown diagrammatically at 48 for the video display or in the form of hard copy 50 in conjunction with digital plotter 33.

Figure 8:
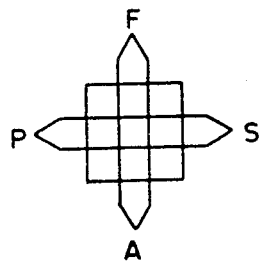
FIG. 8 represents a dual-axis accelerometer.
Figure 9:
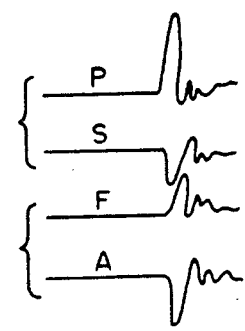
FIG. 9 shows how to interpret the accelerometer output signals.
Figure 1:
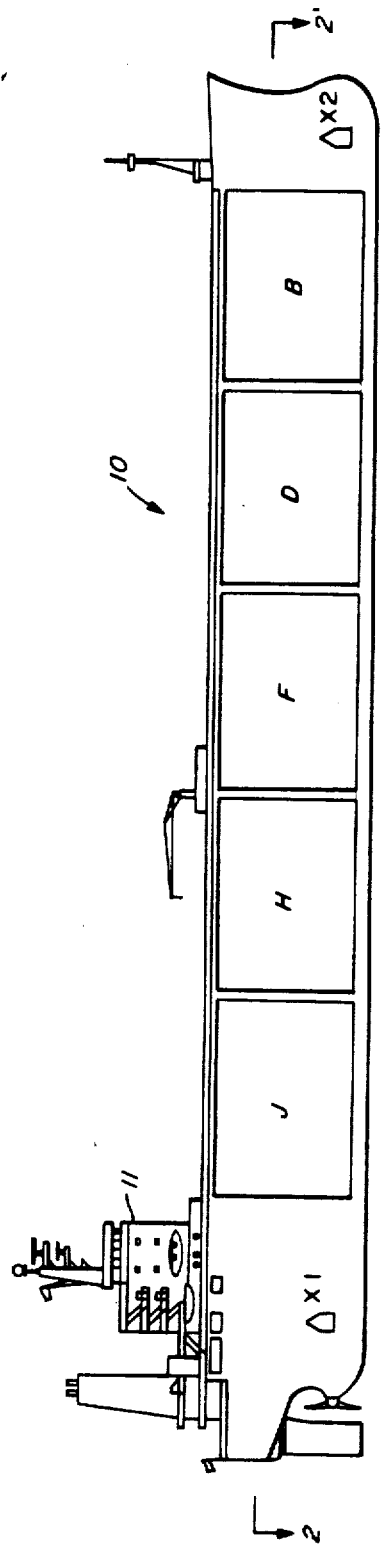
Figure 2:
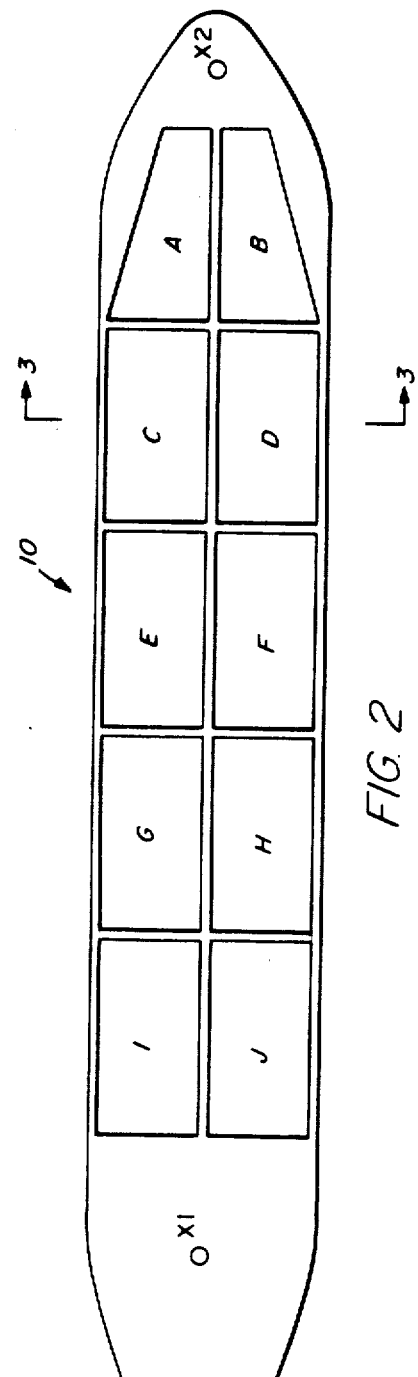

It is of interest to know something about the force of a collision. Is it great enough to cause hull penetration or merely enough to dent the hull? The question can be answered at least qualitatively by use of one or more accelerometers mounted in different places on the ship as shown in FIG. 1. FIG. 8 is symbolic of a biaxial accelerometer 48 of any well known type. The electrical output will be two transient wave forms, one for each axis, having amplitude and polarity as shown in FIG. 9. The amplitude will be proportional to the G-force of a collision. The accelerometer can be calibrated by the naval architect at the shipyard by standard laboratory impact tests. The polarity convention may be set so that a positive-going pulse on the P-S axis signifies an impact to port and a negative-going deflection signifies a starboard bump. Similarly, for the fore-and-aft axis, a positive-going pulse indicates a bow collision.

To summarize the preferred mode of operation, sensors such as hydrophones or hydrophone arrays are installed in each of the tanks of a tanker ship. Signals from the sensors are multiplexed into a gain ranging amplifier, thence to a computer, whence they are passively displayed on a multi-trace real time video monitor screen. During normal operations, the displayed traces are relatively quiet. In the event of a collision, the sensors detect the shock wave due to the impact. The computer senses the high-amplitude signals resulting from the impact and triggers a normally inactive video display or a digital graphic plotter to produce a hard copy map of the hydrophone locations. The arrival-time differences between at least two different pairs of sensors are measured. Hyperbolae of constant time difference are projected over the map of the hydrophone locations with the foci of the hyperbolae positioned over the map positions of each hydrophone of the pair in question. The measured time differences for the respective pairs are plotted on the map as intersecting lines of position. The intersection marks the point of impact. The G-force of the collision may be measured qualitatively by means of dual-axis accelerometers.

We have described our invention in terms of our presently-preferred embodiment. Our preferred mode of operation has been described. Other techniques will be considered by those skilled in the art. In one example, we use an overlay to map the location of an impact.

We also explain how the computer 28 can provide a graphic display on the video display 31 or on a graphic plotter 33. Those data could also be recorded on digital magnetic tape, on a video cassette or on a floppy disk. Our invention is limited only by the appended claims.

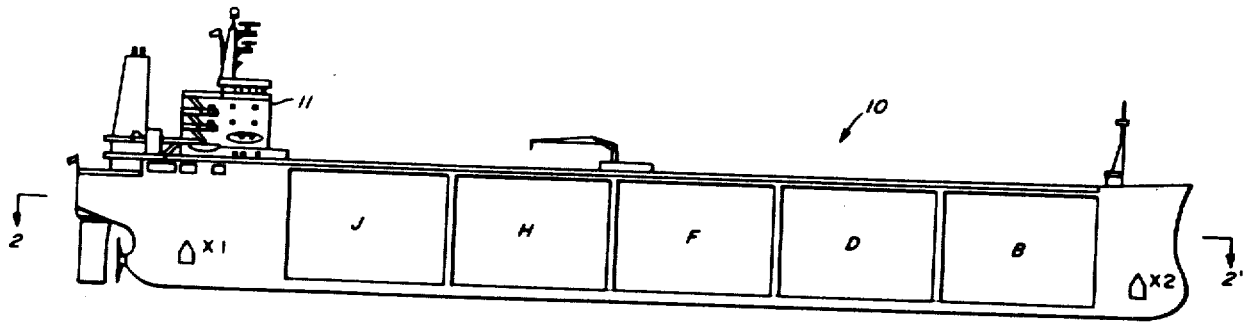

We claim as our invention:

1. A damage location system, comprising:
   a ship;
   a plurality of liquid cargo tanks incorporated in said ship;
   at least one passive acoustic sensor mounted inside each one of said plurality of tanks;
   means, in communication with said sensors, for recording acoustic signals detected by said sensors, said acoustic signals including normal ambient ship's noise and impulsive shock wave signals due to an impact of said ship with an obstacle;
   means for fixing the location on said ship of said impact by analyzing the first-arrival time difference of the impulsive shock wave signals detected by said sensors.

2. The system as defined in claim 1, further comprising:
   at least one biaxial accelerometer mounted on said ship for measuring the force and direction of an impact of said ship with an obstacle in the water.

3. The system as defined in claim 2, comprising:
   timing means, associated with said means for recording, for measuring the relative first-arrival times of said detected impulsive shock wave signals at each of the respective sensors.

4. The system as defined in claim 3, comprising:
   means for measuring the relative differences in arrival times of said detected shock wave signals between the two sensors of any two different pairs of sensors; and
   means for establishing the location of said impact by marking on said map lines of position corresponding to the measured time differences between the two sensors of each said pair of sensors.

5. The system as defined by claim 4, wherein:
   said means for marking includes a family of hyperbolae representing lines of constant time differences projected on said map, the foci of said hyperbolae being spaced apart by a distance equal to the separation between the two sensors of a pair of sensors under consideration.

6. The system as defined by claim 1, comprising:
   means, associated with said means for recording, for establishing the ship's ambient noise signature under normal conditions of weather and loading.

7. The system as defined by claim 6, comprising:
   means, associated with said means for recording, for inhibiting recording of signal from said sensors unless the amplitude level of a transient signal exceeds the average signal amplitude level of said ambient noise signature by a preselected value.

8. The system as defined by claim 7, comprising:
   means, associated with said means for inhibiting, for periodically re-establishing said ambient noise signature to accommodate the system to changing weather and loading conditions.

9. In a ship having a plurality of liquid cargo tanks, a method for locating a point of impact due to collision with an object, comprising:
   mounting a hydrophone array in each one of said plurality of cargo tanks;
   detecting with said hydrophone arrays, average ambient noise transients and impulsive shock waves;
   measuring the relative times of first arrival of said impulsive shock waves at each said hydrophone;
   calculating the differences in the times of first arrival of the impulsive shock waves at the two hydrophones of any two selected pairs of hydrophones;
   from the calculated shock wave arrival time differences, defining two lines of constant shock wave first arrival time difference with respect to the two hydrophones corresponding to each said selected pair of hydrophones; and
   fixing the point of impact at the point of intersection of the two lines of constant shock wave arrival time difference.

10. The method as defined by claim 9, comprising:
    measuring the force and direction of said impact with a biaxial accelerometer.

11. The method as defined by claim 10, comprising:
    providing a map of the locations of the hydrophones on said ship;
    projecting a family of hyperbolae representing lines of constant arrival-time differences on said map, the separation of the foci of said hyperbolae being equal to the separation between the two hydrophones of each said selected pair of hydrophones; and
    defining the lines of constant shock wave arrival-time differences on said map with the aid of the projected family of hyperbolae.

* * * * *

UNITED STATES PATENT AND TRADEMARK OFFICE
CERTIFICATE OF CORRECTION

PATENT NO. : 5,018,113

DATED : May 21, 1991

INVENTOR(S) : Strange, Booth B. et al.

It is certified that error appears in the above-identified patent and that said Letters Patent is hereby corrected as shown below:

The title page showing the illustrative figure, should be deleted and substitute the attached title page.

The locations of accelerometers X1 and X2 should be included in Figures 1 and 2 per the enclosed corrected drawing sheet.

Signed and Sealed this

First Day of December, 1992

Attest:

DOUGLAS B. COMER

Attesting Officer

Acting Commissioner of Patents and Trademarks

United States Patent [19]

Strange et al.

[11] Patent Number: 5,018,113
[45] Date of Patent: May 21, 1991

[54] DAMAGE LOCATION SYSTEM FOR A TANKER SHIP

[76] Inventors: Booth B. Strange, 11106 Wickway, Houston, Tex. 77042; Ben B. Thigpen, 13914 Kimberly, Houston, Tex. 77079

[21] Appl. No.: 545,571

[22] Filed: Jun. 29, 1990

[51] Int. Cl.⁵ .............................................. G01S 3/808
[52] U.S. Cl. .................................. 367/127; 367/191; 367/129; 73/786
[58] Field of Search ................... 73/786; 367/13, 127, 367/129, 191

[56] References Cited

U.S. PATENT DOCUMENTS

| | | | |
|---|---|---|---|
| 4,241,683 | 12/1980 | Conway | 114/74 R |
| 4,249,834 | 2/1981 | Bouvier | 405/70 |
| 4,285,241 | 8/1981 | Smith et al. | 73/572 |
| 4,301,006 | 11/1981 | Davis | 210/96.1 |
| 4,317,186 | 2/1982 | Nishi et al. | 367/127 |
| 4,412,501 | 11/1983 | Davis | 114/270 |
| 4,480,480 | 11/1984 | Scott et al. | 73/786 |
| 4,586,378 | 5/1986 | Izumi et al. | 367/129 |
| 4,897,823 | 1/1990 | Krien | 367/127 |

*Primary Examiner*—Ian J. Lobo
*Attorney, Agent, or Firm*—William A. Knox

[57] ABSTRACT

Hydrophones are installed in each tank of a liquid cargo tanker ship. In the unfortunate event that the tanker collides with an obstacle in the water, the hydrophones detect the shock wave due to the collision. The relative first arrival times of the shock wave at the respective hydrophones are measured and the arrival-time differences between two hydrophones of any two different selected pairs of hydrophones is calculated. Hyperbolic lines of constant time difference are projected on a map of the locations of the hydrophones on the ship. The intersection of the lines of position representing the calculated first arrival time differences marks the location of the impact of the ship with the obstacle.

11 Claims, 4 Drawing Sheets